Jan. 26, 1971  E. F. SVERDRUP ET AL  3,558,360
FUEL CELL COMPRISING A STABILIZED ZIRCONIUM OXIDE
ELECTROLYTE AND A DOPED INDIUM
OR TIN OXIDE CATHODE
Filed Jan. 8, 1968  5 Sheets-Sheet 1

WITNESSES
Theodore F. Wrobel
Lee P. Johns

INVENTORS
Edward F. Sverdrup, Albert D. Glasser
and David H. Archer
BY
Frederick Shapoe
ATTORNEY FIG.5.
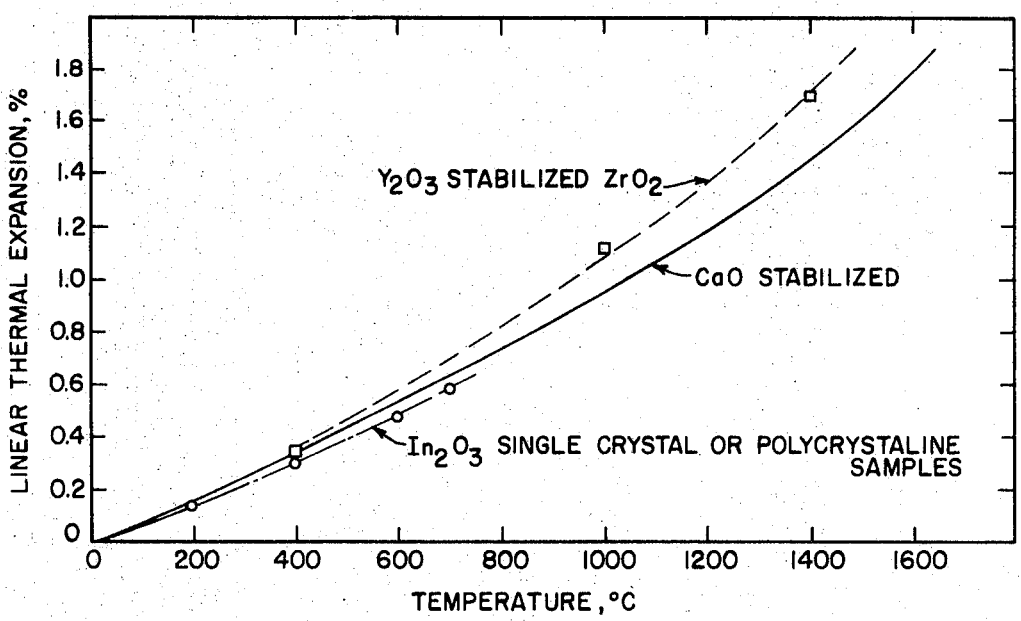
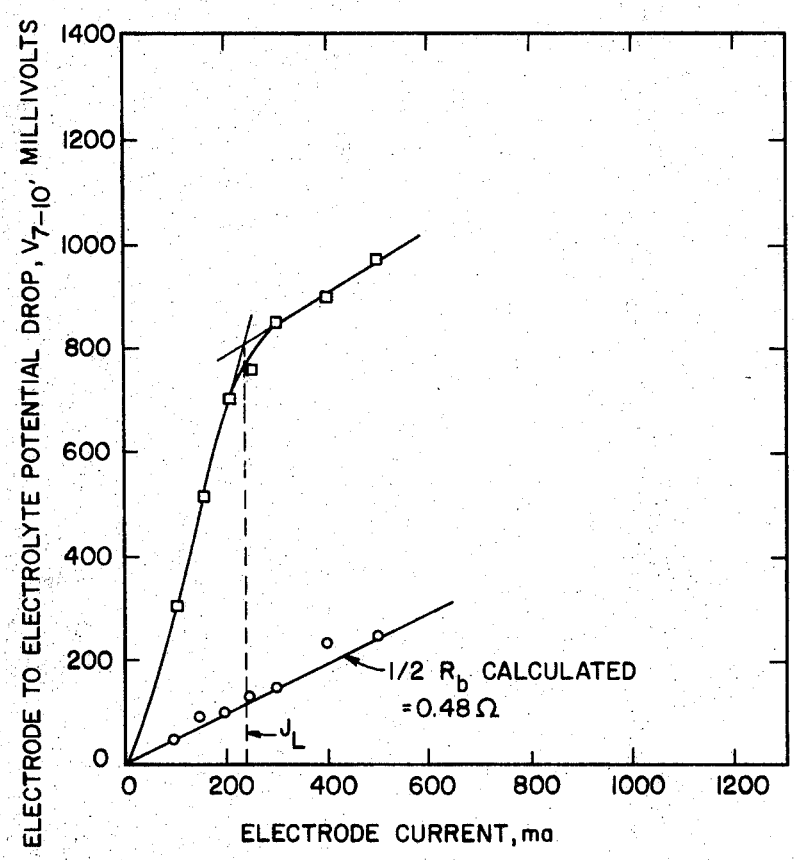
FIG.6.

United States Patent Office 3,558,360
Patented Jan. 26, 1971

3,558,360
FUEL CELL COMPRISING A STABILIZED ZIRCONIUM OXIDE ELECTROLYTE AND A DOPED INDIUM OR TIN OXIDE CATHODE
Edward F. Sverdrup, Jeannette, and Albert D. Glasser and David H. Archer, Pittsburgh, Pa., assignors to Westinghouse Electric Corporation, Pittsburgh, Pa., a corporation of Pennsylvania
Filed Jan. 8, 1968, Ser. No. 696,352
Int. Cl. H01m 27/00
U.S. Cl. 136—86           9 Claims

ABSTRACT OF THE DISCLOSURE

A fuel cell having an electrolyte composed of a ridged ceramic material that conducts current by diffusion of oxygen ions at about 1,000° C., having a fuel electrode on one side of the electrolyte and an air electrode on the opposite side thereof, and the air electrode being composed of one of the materials including indium oxide and tin oxide which is doped to be an electronic conductor having a resistivity of less than $10^{-3}$ ohm-centimeters.

---

This invention resulted from work done under Contract 14-01-0001-303 with the Office of Coal Research of the United States Department of the Interior, pursuant to the Coal Research Act, 30 U.S.C. 661–668 (1964).

BACKGROUND OF THE INVENTION

Field of the invention

This invention relates to a solid electrolyte fuel cell, and more particularly, it pertains to an air electrode for a solid electrolyte fuel cell which electrode is composed of indium oxide or tin oxide which is doped with an element that reduces its resistivity to less than $10^{-3}$ ohm-centimeters such as tin, antimony, tellurium, and mixtures thereof.

Description of the prior art

The basic component of a solid electrolyte fuel cell is an electrolyte composed of a ceramic material, such as zirconia-calcia $[(ZrO_2)_{0.85}(CaO)_{0.15}]$, or zirconia-yttria $[(ZrO_2)_{0.9}(Y_2O_3)_{0.1}]$. The ceramic material is imprevious to gases such as hydrogen and oxygen but has the ability to conduct a current by the passage of oxygen ions through the crystal lattice. The ease with which these ions pass through the electrolyte is measured by the electrical resistivity of the electrolyte, which in turn is a function of the temperature.

Solid electrolyte fuel cell batteries have been investigated. One type of battery includes a short cylindrical electrolyte segment on which a fuel electrode is disposed on one side surface of the cylinder and on which an air electrode is disposed on the other side surface of the cylinder. Both electrodes were composed of metal with the air electrode being composed of platinum. The disadvantage of solid electrolyte fuel cell batteries having air electrodes composed of platinum was twofold: it was costly and short-lived. Although platinum functions satisfactorily as an air electrode, it is costly and must be replaced within a relatively short time because of its rapid volatilization.

In accordance with this invention it has been found that the foregoing problem may be overcome by replacing the platinum air electrode with (1) indium oxide ($In_2O_3$) when doped with tin or antimony, or (2) tin oxide ($SnO_2$) when doped to be a good electronic conductor. Moreover, these doped oxides are stable in air and possess compatibility with the ceramic electrolyte, at the fuel cell operating temperature of about 1,000° C. They are relatively inexpensive.

Accordingly it is a general object of this invention to provide a solid electrolyte fuel cell which is less costly and more durable than fuel cells of prior construction.

It is another object of this invention to provide a solid electrolyte fuel cell having acceptable electrode voltage losses and having negligible contact resistance.

It is another object of this invention to provide a solid electrolyte fuel cell which may be used as an oxygen producer for the support of life in space or underwater.

Finally, it is an object of this invention to satisfy the foregoing objects and desiderata in a simple and expedient manner.

SUMMARY OF THE INVENTION

Briefly, the solid electrolyte fuel cell of the present invention comprises an electrolyte in the form of a sheet or tube having a wall thickness from about $1 \times 10^{-5}$ to 0.5 centimeter which is composed of a ceramic material such as $$[(ZrO_2)_{0.85}(CaO)_{0.85}] \text{ or } [(ZrO_2)_{0.9}(Y_2O_3)_{0.1}]$$

an electronically-conducting fuel electrode on one side of the electrolyte, an air electrode on the other side of the electrolyte and being composed of a material selected from a group consisting of indium oxide ($In_2O_3$) and tin oxide ($SnO_2$), and of a doping material for reducing its resistivity to less than $10^{-3}$ ohm-centimeters. The fuel cell may be either self supporting or may be applied to a support that provides mechanical stability.

BRIEF DESCRIPTION OF THE DRAWINGS

For a better understanding of the invention reference is made to the drawings in which:

FIG. 5 is a graph comprising the linear thermal expansion characteristics of indium oxide and stabilized cubic zirconia;

FIG. 6 is a chart showing the volt-ampere characteristic of indium sesquioxide air electrode prior to treatment and showing the nature of polarization;

DESCRIPTION OF THE PREFERRED EMBODIMENTS

Figure 1:
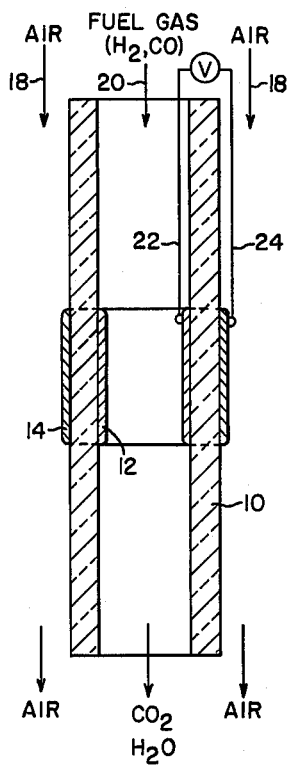
FIG. 1 is a diagrammatic sectional view of a fuel cell including a ceramic electrolyte, a fuel electrode, and an air electrode.

A high temperature fuel cell using a solid electrolyte and electronically conducting oxides as the air-electrodes has been developed for generating electric power with high efficiency by reacting conventional hydrocarbon fuels with oxygen from air. Such a cell is shown in FIG. 1 which includes a solid electrolyte 10, a fuel electrode 12, and an air electrode 14.

The solid electrolyte 10 is composed of a zirconia-base ceramic material such as zirconia-calcia $$[(ZrO_2)_{0.85}(CaO)_{0.15}]$$

and zirconia-yttria $[(ZrO_2)_{0.9}(Y_2O_3)_{0.1}]$, the latter of which has higher conductivity though either one may be used. Various other zirconia-based electrolytes may be used which are stabilized in the cubic fluorite crystal lattice structure with additions of an oxide such as $CaO_1$, $Y_2O_3$, $Yb_2O_3$, $Dy_2O_3$, $La_2O_3$, $Nd_2O_3$, and mixtures thereof. This solid electrolyte 10 may be of any configuration such as a flat plate, a thin film, or a tubular member as shown in FIG. 1.

The fuel electrode 12 is applied to the side of the electrolyte 10 opposite that of the air electrode 14. The fuel electrode 12 is composed of an electronically conducting material having an electrical resistivity of less than $10^{-3}$ ohm-centimeters. It may be a metal such as platinum. The fuel electrode 12 may be applied in a variety of ways such as by a vapor deposition, dipping, spraying.

The air electrode 14 is composed of a base material selected from a group consisting of indium oxide ($In_2O_3$) and tin oxide ($SnO_2$). The base material is doped with an element that reduces the resistivity of the oxide to less than $10^{-3}$ ohm-centimeters. If the base material is indium oxide the oxide is doped with at least one element of the group consisting of antimony, chlorine, fluorine, gallium, germanium, tantalum, tellurium, tin, titanium, tungsten, and mixtures thereof. The preferred elements are tin or antimony. If the base material is tin oxide it is doped with at least one element of the group mentioned above for indium oxide with the deletion of tin and the addition of indium. The preferred element is antimony. Although the foregoing mixtures of indium oxide as a base material, or tin oxide as a base material, have improved conductivity, it has been found that the addition of calcium chloride ($CaCl_2$) further improved the conductivity and reduces the polarization voltage loss of the electrode 14 at the operating temperature of from about 700° to about 1,200° C., as well as improving the adherence or bonding of the indium oxide base material to the electrolyte 10. The preferred temperature is about 1,000° C.

The electronic configuration of indium, tin, antimony, tellurium, and oxygen atoms is shown in the following table.

TABLE

| Indium | 2 | 8 | 18 | 18 | $5s^2$ | $5p$ |
|---|---|---|---|---|---|---|
| Tin | 2 | 8 | 18 | 18 | $5s^2$ | $5p^2$ |
| Antimony | 2 | 8 | 18 | 18 | $5s^2$ | $5p^3$ |
| Tellurium | 2 | 8 | 18 | 18 | $5s^2$ | $5p^4$ |
| Oxygen | 2 | $2s^2$ | $2p^4$ | | | |

In stannic oxide ($SnO_2$) the two $5s$ electrons and the two $5p$ electrons of the tin are shared with the $2p$ electrons of the oxygen. An energy gap of between 3.5 and 4.2 electron volts exists between the valence and the conduction band associated with the configuration.

Figure 2:
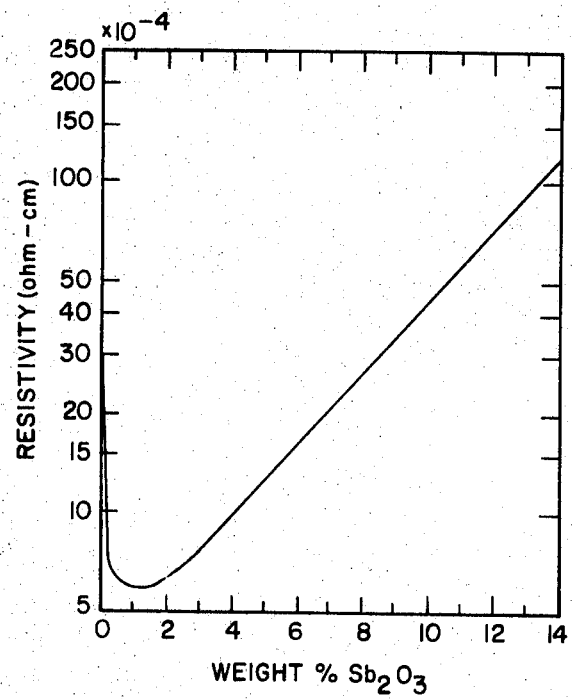
FIG. 2 is a graph showing the effect of antimony doping on the room temperature resistivity of tin oxide.

The conductivity of stannic oxide is much enhanced by the addition of antimony donor atoms. It has been shown that on antimony-doped tin-oxide films that temperatures at and above that of liquid nitrogen each antimony donor atom is ionized. At concentrations of above $1 \times 10^{-3}$ mol percent of antimony measurements of conductivity versus temperature indicate that the number of intrinsic conduction electrons and electrons contributed from lattice defects can be neglected in comparison to those provided by the antimony donors. The effects of even larger antimony donor concentrations on electrical conductivity indicate (FIG. 2) that the conductivity increases with increasing antimony content up to 1 weight percent $Sb_2O_3$ (1 mol percent Sb) and then decreases as the antimony content is further increased.

In indium oxide ($In_2O_3$) the $5s$ and $5p$ valence electrons of two indium atoms are shared with the $2p$ electrons of three oxygen atoms. An energy gap of 3.1 to 3.5 electron volts exists between the valence and conduction bands associated with these states. Room temperature resistivities of the order of 0.2–3 ohm-centimeters in four relatively pure, single crystal samples have been observed.

Figure 3:
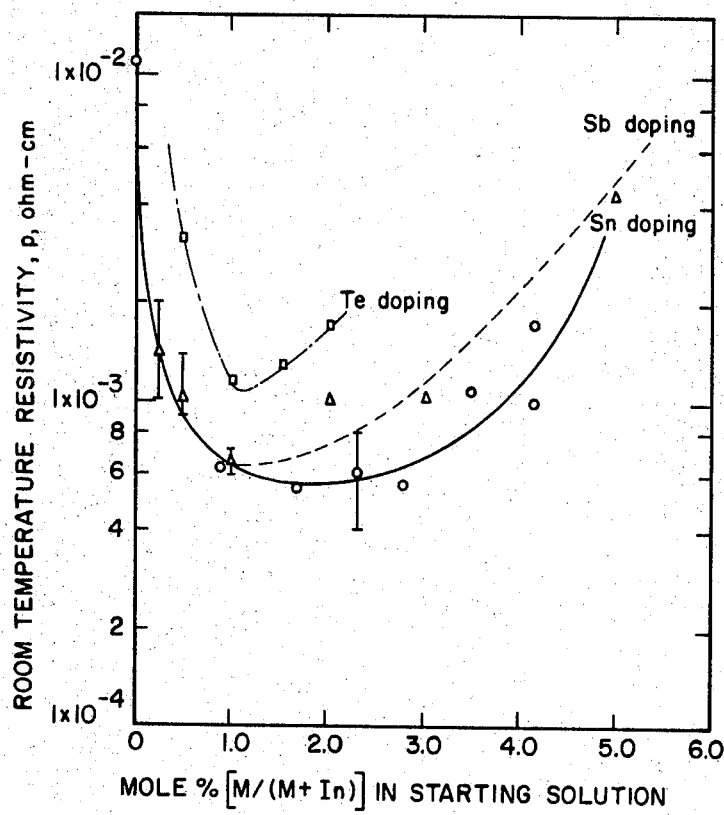
FIG. 3 is a graph showing the effect of doping on the resistivity of indium sesquioxide.

Tin, antimony, and tellurium will substitute for indium in the indium oxide crystal lattice. These atoms act as donors, contributing electrons to a conduction band at room temperature. As shown in FIG. 3 the room temperature resistivity depends on the concentration of donor ion in the starting solutions from which these electrode films are prepared. With optimum doping, resistivities are reduced to less than $7 \times 10^{-4}$ ohm-centimeters at room temperature. As in tin oxide, the donor atoms in $In_2O_3$ are completely ionized at room temperature and the temperature coefficient of resistivity is determined by the predominant electron scattering mechanism. At the temperature 1,000° C. resistivities of about $10^{-3}$ ohm-cm. are observed with optimum tin doping. This is a sufficiently low resistivity to make attractive electrodes.

The internal ohmic resistance of a fuel cell consists of contributions from the electronic conductivity of its two electrodes and the ionic conductivity of the electrolyte. An approximate expression for cell resistance is:

$$R_{cell} \simeq \left(\frac{\rho_e}{\delta_e}\right)_a \frac{L/2}{\pi D} + \frac{\rho_b \delta_b}{\pi DL} + \left(\frac{\rho_e}{\delta_e}\right)_f \left(\frac{L/2}{\pi D}\right) \quad (1)$$

where:

$(\rho_e/\delta_e)_a$ = air electrode electronic resistivity divided by air electrode thickness, ohm-cm./cm.
$L$ = effective length of cell, cm.
$\pi D$ = width of cell, cm.
$\rho_b$ = ionic resistivity of electrolyte, ohm-cm.
$\delta_b$ = electrolyte thickness, cm.
$\pi DL$ = cross sectional area of electrolyte, cm.$^2$.
$(\rho_e/\delta_e)_f$ = fuel electrode electronic resistivity divided by fuel electrode thickness, ohm.

As can be seen an optimum fuel cell length "L" exists to minimize internal resistance. With present values of electrolyte thickness ($\delta_b \simeq 0.1$ cm.), and electrolyte resistivity ($\rho_b \approx 10$ ohm-cm.), $(\rho_e/\delta_e)_a$ or $(\rho_e/\delta_e)_f$ must be held below one ohm-cm./cm. in order that electrode losses will be sufficiently low when fuel cells are made with practical physical lengths.

The oxides of indium and tin ($In_2O_3$ and $SnO_2$) when doped with tin, antimony, and tellurium display electrical resistivities at fuel cell operating temperatures of the order of $10^{-3}$ ohm-cm. They are easily applied to thicknesses up to $10^{-2}$ cm. in the case of indium oxide and $10^{-3}$ cm. in the case of tin oxide. Resistivity/thickness values below one ohm are achieved with either of these materials.

These oxide electrode materials are easily applied to ceramic electrolytes by a vapor deposition process. Specifically, dilute hydrochloric acid solutions of stannic chloride mixed with appropriate amounts of antimony chloride (or indium trichloride mixed with stannic chloride) are sprayed into a furnace which supplies sufficient heat to vaporize the reactant stream. This vapor stream is then carried into a deposition furnace where, on contacting the heated electrolyte, oxide coatings of tin oxide or indium oxide are deposited. An inert gas has been used to transport the vapor through the deposition system. Control of the concentrations of the various reactants, of the carrier gas flow rate, and of the heat inputs to the various furnaces assures reproducible film characteristics. The following general considerations apply to the electrode application process:

(A) The vaporization furnace temperature and heat input must be sufficiently high to ensure vaporization of the reactants, it must be kept below a value which will cause the formation of significant quantities of the oxide in the gas stream; i.e., the vapor phase reaction of:

$$2InCl_3 + 3H_2O \rightarrow In_2O_3 + 6HCl$$

or $$SnCl_4 + 2H_2O \rightarrow SnO_2 + 4HCl$$

must be avoided. For the specific furnace configuration and reactant concentrations used in our experiments the optimum vaporization temperature for the formation of tin oxide films is between 325 and 430° C. For the deposition of indium oxide films, vaporization furnace temperatures between 850 and 950° C. gives good results.

(B) The deposition furnace temperature must supply the necessary heat to promote the oxidation reactions mentioned above on the substrate but must be low enough to inhibit appreciable vapor phase reaction. Deposition furnace temperatures of 700–750° C. are used with $SnO_2$ and 1,000° C. with $In_2O_3$.

Figure 4:
FIG. 4 is a photomicrograph of the surface of vapor-deposited indium oxide electrode films.

(C) Hydrochloric acid concentration plays an important role in the deposition processes. Oxygen can be introduced into the reactant stream, so that the reactions:

$$4InCl_3 + 3O_2 \rightarrow 2In_2O_3 + 6Cl_2$$

or $$SnCl_4 + O_2 \rightarrow SnO_2 + 2Cl_2$$

also take place on the substrate surfaces. The addition of oxygen appears to improve the quality of the films. The appearance of a typical oxide film applied by this process is shown in FIG. 4.

Thermodynamic considerations show that the loss of material from an $SnO_2$ electrode film in an air atmosphere would most likely occur through gradual decomposition to the gaseous monoxide-SnO. A vapor pressure of $10^{-8}$ atmosphere of SnO over $SnO_2$ at 1,000° C. is indicated. Rough estimates of the rate of material loss through saturation of the fuel cell air supply with SnO indicate that an electrode life of over five years can be anticipated. Tin oxide appears to be a stable air electrode material.

Experimental determinations of the equilibrium pressures existing over indium oxide $(In_2O_3)$ at 1,000° C. indicate that a decomposition to the gaseous sub-oxide $(In_2O)$ is the most likely cause for loss of this electrode material. With an oxygen partial pressure of $2 \times 10^{-8}$ atmosphere over the $In_2O_3$ the $In_2O$ vapor pressure is $4 \times 10^{-8}$ atmospheres. In the presence of an oxygen partial pressure of 0.2 atmosphere, corresponding to one atmosphere of air over the electrode, decomposition to $In_2O$ would be inhibited and a vapor pressure of $10^{-15}$ atmospheres of $In_2O$ would be expected.

$In_2O_3$ appears to be even more stable than tin oxide and holds up very well on the air side of the fuel cell.

These considerations do not give any indication of the possible loss of the doping agent from the oxide film. Since loss of the doping agent would cause increases in the resistivity of the film material, tests have been made in which $\rho_e/\delta_e$ is measured as a function of time of electrode operation. In test periods of about one month there have been no measurable changes with either electrode material.

Stannic oxide crystallizes with the tetragonal structure with lattice parameters as: $a_0=4.72$, $c_0=3.16$, $\mu=0.31$. The material has a coefficient of thermal expansion of $4.5 \times 10^{-6}$ cm./cm.—° C. which is roughly one half that of the electrolyte: $10 \times 10^{-6}$ cm./cm.—° C. Films having thickness between $10^{-4}$ and $10^{-3}$ cm. have been successfully applied to the electrolyte by the thermal decomposition of tin-chloride solutions. These films have adhered well and have withstood repeated thermal cycling between room temperature and 1,000° C. Films which exceed $3 \times 10^{-3}$ cm. in thickness develop tensile stresses in electrolytes of 0.1 cm. thickness which are sufficient to crack the electrolyte when the samples are cooled to room temperature.

Studies of solid state reactions between $SnO_2$ and $ZrO_2$ indicate a solubility of $ZrO_2$ in $SnO_2$ of 19 p.p. 100 mols between 800 and 1,300° C. and a solubility of $SnO_2$ in monoclinic $ZrO_2$ of 9 p.p. 100 mols at 800° C.

The rates of solid state diffusion must be low since no observable sintering of one-micron tin-oxide powders to electrolyte disc could be obtained after heating for four hours at 1,400° C. At 1,600° C., however, the reaction proceeds rapidly and after 20 minutes of exposure the electrolyte material had become frangible. Thus additions of $SnO_2$ tend to destabilize cubic zirconia. No evidence of alternation of the electrolyte could be seen on photomicrographs of tin oxide coated electrolyte test specimens after four hundred hours of electrode operation at 1,000° C. Tin oxide electrodes formed by the chloride decomposition process are sufficiently stable in contact with the electrolyte to make useful electrode structures.

Indium oxide crystallizes into a deformed cubic fluorite crystal in which three-fourths of the fluorine positions are occupied by oxygen, the remainder remaining vacant. The lattice parameter is $a_0=10.118$ A. at 26° C. This matches well with the similar spacing in cubic zirconia which is $2a_0=2 \times 5.10$ A.$=10.20$ A. As shown in FIG. 5 the linear thermal expansion of $In_2O_3$ single crystal and polycrystalline samples match that of cubic zirconia. Adherent oxide layers that withstand thermal cycling between room temperature and 1,000° C., with or without electrode operation at the high temperature, have been applied to the electrolyte by vapor deposition. Only when the indium oxide layer exceeds $9 \times 10^{-3}$ cm. in thickness does any loosening of the electrode film from the electrolyte substrate occur.

To determine whether the electrolyte and indium oxide would interact when held for long times at elevated temperatures, yttria-stabilized zirconia electrolyte test wafers were immersed in a bed of one micron indium-oxide powder and sintered at various temperatures between 1,400° C. and 1,920° C. for 20 minutes in an air atmosphere. Below 1500° C. no sintering or other evidence of interaction occurs. Above 1500° C. considerable reaction took place. A eutectic temperature in the vicinity of 1600° C. is indicated by these tests in the $In_2O_3$-$ZrO_2$ system.

Sinterings for twelve hours at 1400° C. without detectable interaction indicate that $In_2O_3$ electrode films applied by vapor deposition or similar low temperature processes will be stable in contact with the electrolyte under fuel cell operating conditions.

Vapor deposited tin and indium oxide electrode films were operated at electrodes carrying out the air electrode reaction:

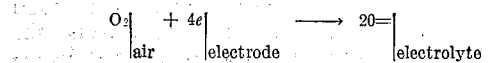

The voltage losses associated with carrying out this process were measured using the electrode tester and monitoring the electrode to electrolyte voltage as a function of electrode current density. The current-interruption technique was used to separate the ohmic losses associated with oxygen ion transport in the electrolyte and the electrode to electrolyte contact resistance from non-ohmic, "polarization," voltage losses.

The electrical behavior of a typical indium oxide electrode film in its "as deposited" condition is shown in FIG. 6. Polarization voltage drops increase rapidly with electrode current. At 100 ma. (77 ma./cm.²) the polarization component of the voltage drop is 250 millivolts. The resistive component of the voltage (50 millivolts) agrees very well with the expected ohmic contribution from the electrolyte ionic resistance—indicating a low electrode-to-electrolyte contact resistance. The character of the decay of the polarization voltage drop, as shown by the current-interruption oscillograms, changes when the polarization voltage exceeds approximately 700 millivolts. The volt ampere curve becomes almost parallel to the ohmic resistance displayed by the 700 millivolt polarization. The time constant of polarization decay is long and depends upon the length of time the electrode has been operated. A partial electrochemical-reduction of the $In_2O_3$ electrode is apparently responsible. The long decay of the polarization results from the reoxidation of the reduced film when current flow is interrupted.

The "as deposited" indium oxide films are sufficiently impervious to the passage of oxygen that high polarization voltage drops occur at even low current densities (oxygen demands). If the value of the current at which electrochemical breakdown of the indium oxide film occurs is taken as a parameter—the limiting current—and is plotted as a function of the thickness of the oxide electrode film, the limiting current is found to vary inversely with film thickness as illustrated by FIG. 7.

Some treatment in addition to using a thin electrode must be employed to yield electrodes capable of high current densities with low polarization losses. Fortunately, a simple "reverse current" treatment of the electrode film results in greatly improved performance.

Reverse current treatment consists simply of conducting a current across the electrode-electrolyte interface with the air electrode made positive with respect to the electrolyte. Under these conditions oxygen is transported through the electrolyte toward the electrolyte-electrode interface. An oxygen pressure is developed under the electrode film which forces oxygen passages through the previously tight film. When the electrode is operated in the normal direction polarization voltage losses are greatly reduced. Some increase in the electrode to electrolyte contact resistance accompanies the reverse current treatment.

Figure 7:
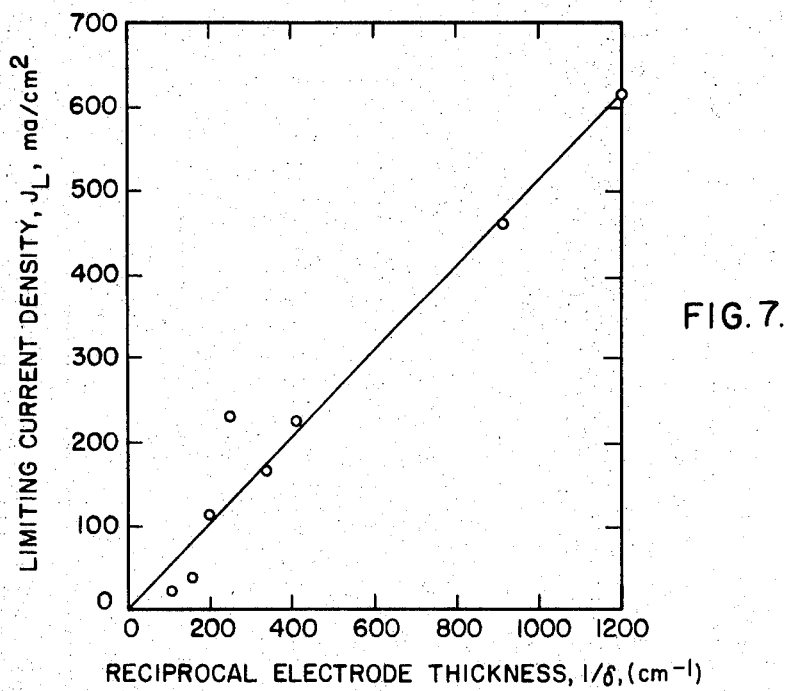
FIG. 7 is a graph showing the effect of electrode thickness on the current density at which the break in voltage-current curve appears.

Comparisons of the volt ampere characteristics of a typical electrode film before and after reverse current treatment are shown in FIG. 7. The resistive component of the electrode to electrolyte voltage drop increases from the calculated value of the electrolyte contribution, 0.48 ohm, to 0.67 ohm while the polarization component drops from 730 mv. to 150 mv. at a current density of 500 ma./ 1.3 cm.² = 380 ma./cm². At a current density of 1,000 ma./1.3 cm.² = 770 ma./cm.² the polarization component of the voltage loss is 220 mv.

Figure 8:
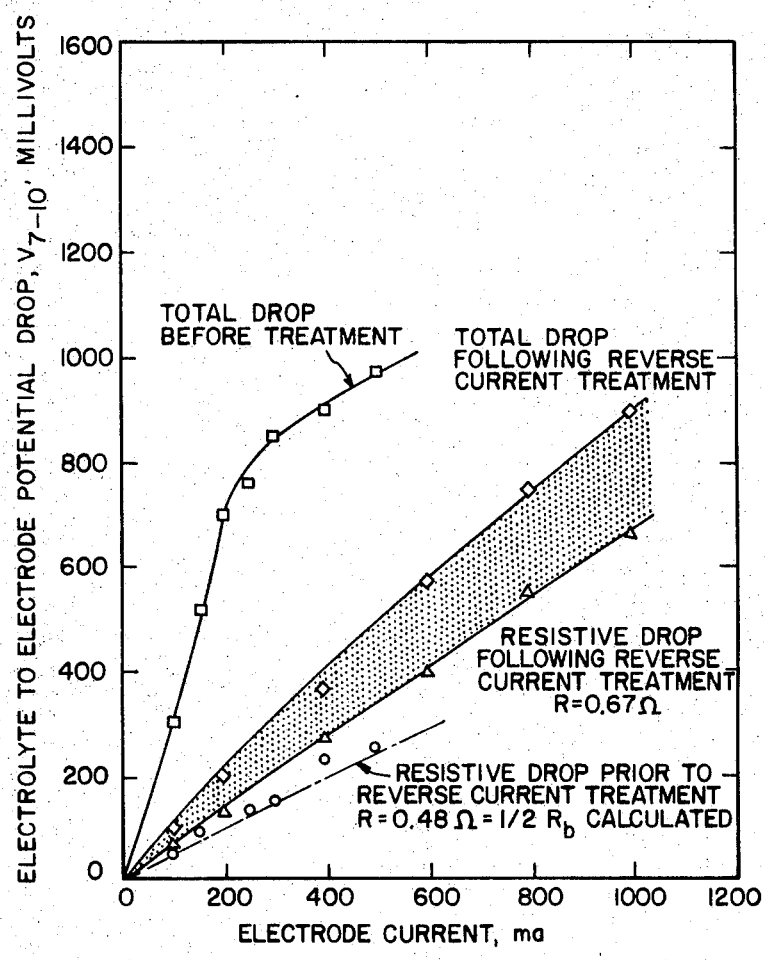
FIG. 8 is a graph showing the volt-ampere characteristic of indium sesquioxide air electrodes before and after "reverse current" treatment.
Figure 9:
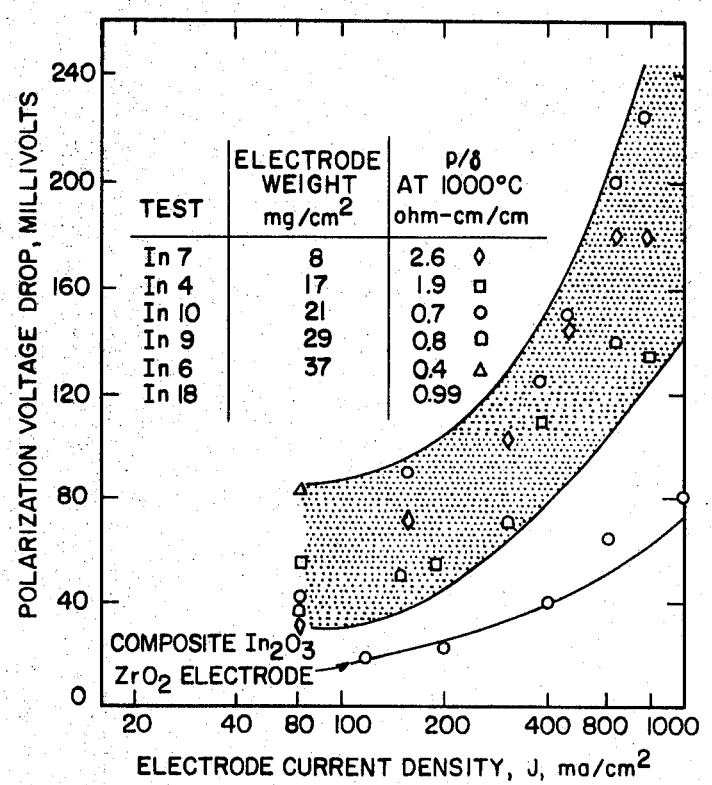
FIG. 9 is a graph showing the indium sesquioxide electrode polarization following reverse current treatment (1,000° C., 1 atm. oxygen)

The polarization characteristics in oxygen of five vapor deposited electrodes after reverse current treatment are shown in FIG. 8. The electrodes cover a range of electrode weights from 8 to 37 milligrams per square centimeter of electrolyte coverage. This corresponds to a range of operating $\rho_e/\delta_e$ from 2.6 ohm centimeter per cm. to 0.4 ohm cm./cm. Polarizations increase from between 30–90 mv. at 100 ma./cm.² to between 120–230 mv. at 1,000 ma./cm.². A limiting current type of polarization behavior suggests that further efforts to increase the permeability of the electrode film to oxygen may be expected to yield lower polarizations.

Tin oxide films performed less satisfactorily. The films tested experimentally displayed electrode resistivity/ thickness parameters of three ohms. Improvements in film application techniques together with optimized doping of the electrode, would make $\rho_e/\delta_e$ values less than one ohm attainable. The experiments indicate that polarization losses are comparable for those reported for $In_2O_3$ films (perhaps even somewhat lower due to the tendency of the $SnO_2$ films to craze under the differential thermal expansion stresses) but that contact resistances between electrode and electrolyte were appreciably higher. There seems a good possibility that the electrode performance could be significantly improved through the use of better application techniques, optimized doping, and the use of a composite structure to provide sufficient porosity in the electrode so that bonds between the tin oxide and the electrolyte are not disturbed by electrochemical reaction during electrode operation.

In FIG. 1 the cell is operated by heating the zone of the electrolyte 10 including the fuel electrode 12 and the air electrode 14 to a temperature about 1,000° C. Air is circulated on the side of the electrolyte including the air electrode 14; that is, the outside surface as shown in FIG. 1 as is indicated by the arrows 18. Similarly the fuel gas such as hydrogen, carbon monoxide or any gaseous hydrocarbons, are circulated past the fuel electrode 12 as indicated by the arrow 20.

The following example is illustrative of the present invention.

Example I

A ceramic tube of solid electrolyte composed of $$(ZrO_2)_{0.9}(Y_2O_3)_{0.1}$$

is provided with a fuel electrode composed of platinum applied by spraying three coats of commerical platinum paste thinned with turpentine and firing each coat in air to 1,000° C. to remove organic binders. An air electrode is then applied to the outer surface of the tube by placing the tube in a quartz reaction tube which in turn is placed in the chamber of a deposition furnace and is heated to a temperature of 1,000° C. The fuel electrode which has been previously deposited is protected by temporarily sealing the ends of the tube.

A solution containing the ingredients of the air electrode is sprayed by an aspirator using air, neon or argon gas as a carrier gas, into the quartz reaction tube having an entry portion which is unoccupied by the ceramic tube which portion is preheated to a temperature of 900° C. The aspirator has an air flow of 3,000 cubic centimeters per minute which assists in transporting the vapors toward the ceramic electrolyte tube where the vapors react on the surface of the tube to form the product indium oxide, tin oxide, and calcium chloride. This composition is derived from the sprayed solution containing $3.74 \times 10^{-3}$ mols per cc. indium, $7.28 \times 10^{-5}$ mols per cc. calcium, $6.83 \times 10^{-5}$ mols per cc. tin, $48.3 \times 10^{-3}$ mols per cc. $H_2O$, and $2.41 \times 10^{-3}$ mols per cc. HCl. The calcium is present as calcium chloride ($CaCl_2$). Indium is present as indium chloride and tin is present as tin chloride. The oxidizing temperature may range from about 900° C. to 1,050° C., the preferred temperature being 1,000° C. The indium chloride and tin chloride react to the metal oxides, indium oxide and tin oxide, and the exit products from the tube are hydrogen chloride, and traces of indium chloride. The film forming solution is sprayed at a rate of 1 to 2 cc. per minute and the desired thickness of the film is from about 10 to 100 microns.

The thickness of the fuel electrode likewise varies from about 10 to 100 microns. The thickness of the electrolyte tube is about 0.1 centimeter.

In operation when the fuel cell is brought to operating temperature of about 1,000° C. wire leads 22 and 24 which are attached to the fuel electrode 12 and the air electrode 14 indicate a generation of voltage when the leads are attached to a volt meter. Current is drawn from the cell by connecting an electrical load between the terminals.

The performance of a composite indium oxide air electrode displays a very low polarization voltage loss (0.050 volt at 700 amps per square foot), negligible contact resistance, and improved resistivity per thickness. An indium oxide film having a weight of 11.5 mg. per centimeter squared showed an operating resistivity over thickness of 0.6 ohm, negligible contact resistance, and a polarization loss of 0.05 volt at 770 amperes per square foot after 830 hours of continous operation.

Figure 10:
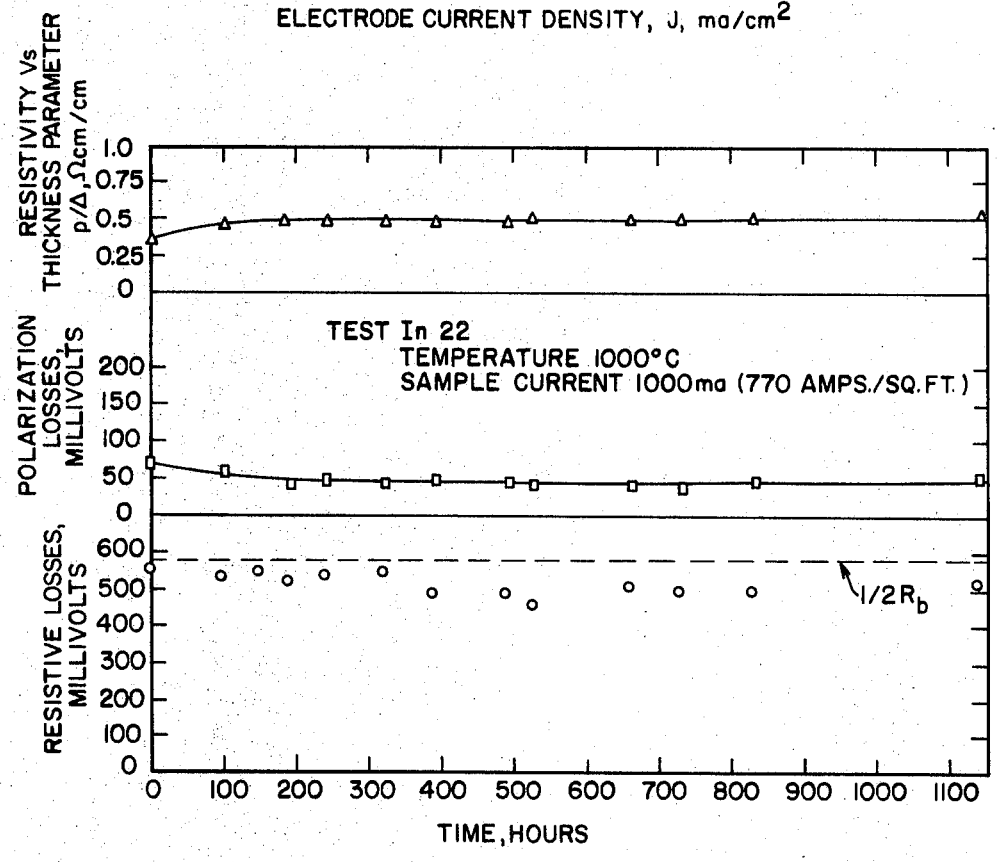
FIG. 10 is a graph showing a life test of a composite $In_2O_3$ air electrode.

The variation of electrode resistivity over thickness and polarization losses with time and operation are shown in FIG. 10.

Example II

The procedure of Example I is followed except that the outside film is grown from a vapor stream containing indium chloride ($InCl_3$) tin chloride ($SnCl_4$), calcium chloride ($CaCl_2$), and zirconium chloride ($ZrCl_4$). The electrode film is prepared from reactant streams adjusted to provide the film consisting of 50 mol percent $In_2O_3$ and 50 mol percent $ZrO_2$. Sufficient tin chloride is present to form a 2.3 mol percent tin in the indium oxide. Sufficient calcium is present to provide 15 mol percent of calcium oxide to stabilize the zirconium oxide in the cubic phase. Ten times the stoichiometric oxygen is supplied to the reaction chamber by an oxygen lance. Sufficient water is also present to supply a further ten times the stoichiometric oxygen requirement. A film weighing 20 mg./cm.$^2$ is formed by vaporizing a hydrochloric acid solution of indium chloride, tin chloride, and calcium chloride without zirconia chloride vapor, displayed a resistivity thickness parameter of about 0.6 ohm at 1,000° C. and a polarization voltage drop of about 0.04 volt at 770 amperes per square foot after 400 hours of continuous operation.

In summary, indium sesquioxide doped with tin, antimony, and/or tellurium is a promising air electrode for solid type electrolyte fuel cells operating at 1,000° C. The material is stable in air and in contact with the electrolyte. It can be easily applied in films having a resistivity/thickness parameter as low as 0.2 ohm-cm. per centimeter/cm. at the operating temperature. Although polarization of voltage losses of the "as deposited" films are high, a simple reverse current treatment reduces the polarization losses to 150–250 mv. at 1,000 ma./cm.$^2$. Increasing the porosity of the indium oxide films reduces the air electrode polarization. Electrodes of the doped indium oxide have been applied to fuel cell batteries. The performance characteristics obtained in batteries confirm those obtained on electrode test specimens.

Tin oxide doped with indium, antimony, and/or tellurium can also be applied to zirconia electrolytes by the thermal decomposition of indium, antimony, and/or tellurium chloride. The films are stable in the operating environment of the air electrode at the 1,000° C. operating temperature of the fuel cell. Despite a lower coefficient of thermal expansion, tin oxide films withstand repeated thermal cycling between room temperature and 1,000° C. When operating as electrodes a weakening of the electrode to electrolyte bond occurs and the electrode flakes off of the electrolyte as it is subsequently cooled to the range of 800–600° C. If tin oxide is used as an electrode in a practical device, either the fuel cell must be held above 800° C., or some method must be developed to keep the electrode attached to the electrolyte during cooling.

It is understood that the above specification and drawings are merely exemplary and not in limitation of the invention.

What is claimed is:

1. In a solid electrolyte fuel cell having an electrolyte member composed of a mixture of a ceramic material having as a major constituent zirconium oxide stabilized with another oxide in a cubic fluoride crystal lattice and having a metal fuel electrode on one side of the electrolyte the improvement comprising an air electrode on the other side of the electrolyte and the air electrode being composed of a material selected from the group consisting of indium oxide and tin oxide, and of a doping material selected from at least one element of the group consisting of antimony, chlorine, fluorine, gallium, germanium, tantalum, tellurium, titanium, tungsten and mixtures thereof and tin if the electrode is indium oxide, and indium if the electrode is tin oxide.

2. The fuel cell construction of claim 1 in which the air electrode and fuel electrode have a thickness of from about 10 to 100 microns.

3. The fuel cell construction of claim 1 in which the electrodes have a thickness of about 20 microns.

4. The fuel cell construction of claim 1 in which the electrolyte is composed of $(ZrO_2)_{0.9}(Y_2O_3)_{0.1}$.

5. The fuel cell construction of claim 1 in which the fuel electrode is composed of platinum.

6. The fuel cell construction of claim 1 in which the air electrode is composed of indium oxide with doping material including tin and calcium.

7. The fuel cell construction of claim 6 in which the doping material also includes zirconium.

8. The fuel cell construction of claim 1 in which the air electrode is composed of tin oxide with doping material including indium and calcium.

9. The fuel cell construction of claim 8 in which the doping material also includes zirconium.

No references cited.

WINSTON A. DOUGLAS, Primary Examiner

H. A. FEELEY, Assistant Examiner